United States Patent [19]
Winfree et al.

[11] Patent Number: 5,937,635
[45] Date of Patent: Aug. 17, 1999

[54] PULSE DETONATION IGNITER FOR PULSE DETONATION CHAMBERS

[75] Inventors: Don D. Winfree, Keller; Louis G. Hunter, Jr., Fort Worth, both of Tex.

[73] Assignee: Lockheed Martin Corporation

[21] Appl. No.: 08/757,855

[22] Filed: Nov. 27, 1996

[51] Int. Cl.[6] .................................................. F02C 5/02
[52] U.S. Cl. ...................... 60/39.38; 60/39.39; 60/39.78; 60/39.81; 431/1
[58] Field of Search ............................... 60/39.38, 39.39, 60/39.78, 39.81, 204, 211, 247, 248; 431/1

[56] References Cited

U.S. PATENT DOCUMENTS

| | | | |
|---|---|---|---|
| 2,928,242 | 3/1960 | Guenther | 60/39.39 |
| 4,693,075 | 9/1987 | Sabatiuk | 60/39.39 |
| 5,353,588 | 10/1994 | Richard | 60/247 |
| 5,428,951 | 7/1995 | Wilson et al. | 431/1 |
| 5,473,885 | 12/1995 | Hunter, Jr. et al. | |
| 5,513,489 | 5/1996 | Bussing | 60/39.38 |
| 5,546,744 | 8/1996 | Winfree et al. | |
| 5,557,926 | 9/1996 | Hunter, Jr. et al. | |
| 5,579,633 | 12/1996 | Hunter, Jr. et al. | 60/247 |
| 5,615,548 | 4/1997 | Winfree et al. | 60/247 |

FOREIGN PATENT DOCUMENTS

| | | | |
|---|---|---|---|
| 826137 | 5/1981 | U.S.S.R. | 431/1 |

*Primary Examiner*—Timothy S. Thorpe
*Assistant Examiner*—Ted Kim
*Attorney, Agent, or Firm*—James E. Bradley

[57] ABSTRACT

A pulse detonation engine has a pulse ignition system, a plurality of detonation chambers (15), an oxygen source (33), and a fuel source (35). The oxygen source and the fuel source supply oxygen and fuel, respectively, to both the pulse ignition system and to the detonation chambers. The pulse ignition system creates detonation waves by igniting a first series of fuel mixtures inside a plurality of igniter tubes (39) equal to the number of detonation chambers (15). One detonation wave is delivered by each igniter tube into each detonation chamber for igniting a second series of fuel mixtures inside the detonation chambers. The detonation waves increase in magnitude as they travel through the detonation chambers before exiting the rearward ends of the detonation chambers. After detonation, the detonation engine is purged of residual gases by a ventilation system (81) and the process is repeated sequentially as described.

14 Claims, 2 Drawing Sheets

PULSE DETONATION IGNITER FOR PULSE DETONATION CHAMBERS

TECHNICAL FIELD

This invention relates in general to pulse detonation engines, and in particular to igniting pulse detonation engines.

BACKGROUND ART

A pulse detonation engine is an apparatus which produces a high pressure exhaust from a series of repetitive detonations within a detonation chamber. The process is a constant volume heat addition process. A gaseous fuel is detonated within a chamber, causing a pulse detonation wave which propagates at supersonic speeds. The detonation wave compresses the fluid within the chamber, increasing its pressure, density and temperature. As the detonation wave passes out the open rearward end, thrust is created. The cycle is then repeated.

One problem encountered with pulse detonation engines is excessive weight. This is especially true for applications involving flight vehicles. A significant contributor to the weight of the apparatus is the conventional high energy spark plug system that is required to ignite each of the detonation chambers. Thus, what is needed is a pulse detonation engine that utilizes a lightweight ignition system for igniting the detonation chambers.

DISCLOSURE OF THE INVENTION

In a first embodiment, the invention comprises a pulse detonation engine with a pulse ignition system and a plurality of detonation chambers. The pulse ignition system has a rotary oxygen valve and a plurality of igniter tubes equal to the number of detonation chambers. The rotary valve has a flywheel with a plurality of ports and is driven by a shaft extending from an electric motor. The igniter tubes are located downstream from and sealingly communicate with the flywheel. Each igniter tube has a spark plug igniter and communicates with a detonation chamber. A fuel valve meters fuel into each igniter tube.

An oxidizer plenum is located upstream from and sealingly communicates with the flywheel. As the flywheel rotates, each port rotatingly aligns with the oxidizer plenum and an igniter tube in an open position. During alignment, oxygen passes from the oxidizer plenum through the flywheel port and into the igniter tube. As oxygen enters the igniter tube, fuel is simultaneously released from the fuel valve so that the oxygen mixes with the fuel. As the flywheel continues to rotate, the flywheel port sealingly rotates out of alignment with the oxydizer plenum and the igniter tube in a closed position. Shortly thereafter, the spark plug ignites the fuel mixture and the ignited mixture transitions into a detonation wave a few diameters downstream of ignition. The detonation wave moves down the igniter tube and into the detonation chamber. As the detonation wave enters the detonation chamber, a second mixture of fuel and oxygen is ignited. This second ignition increases the magnitude of the detonation wave which then passes through the detonation chamber. The pulse detonation engine also has a ventilation or purge system which utilizes an inert gas, preferably helium, to synchronizingly ventilate the engine after each detonation wave cycle in order to purge any residual gases.

The invention also comprises an alternate embodiment with a rotary fuel valve that operates in substantially the same way as the rotary oxygen valve described in the first embodiment.

BRIEF DESCRIPTION OF THE DRAWINGS

FIG. 1b is a sectional view of a pulse detonation engine used in conjunction with the pulse detonation ignition system shown in FIG. 1a.

BEST MODE FOR CARRYING OUT THE INVENTION

Figure 1A:
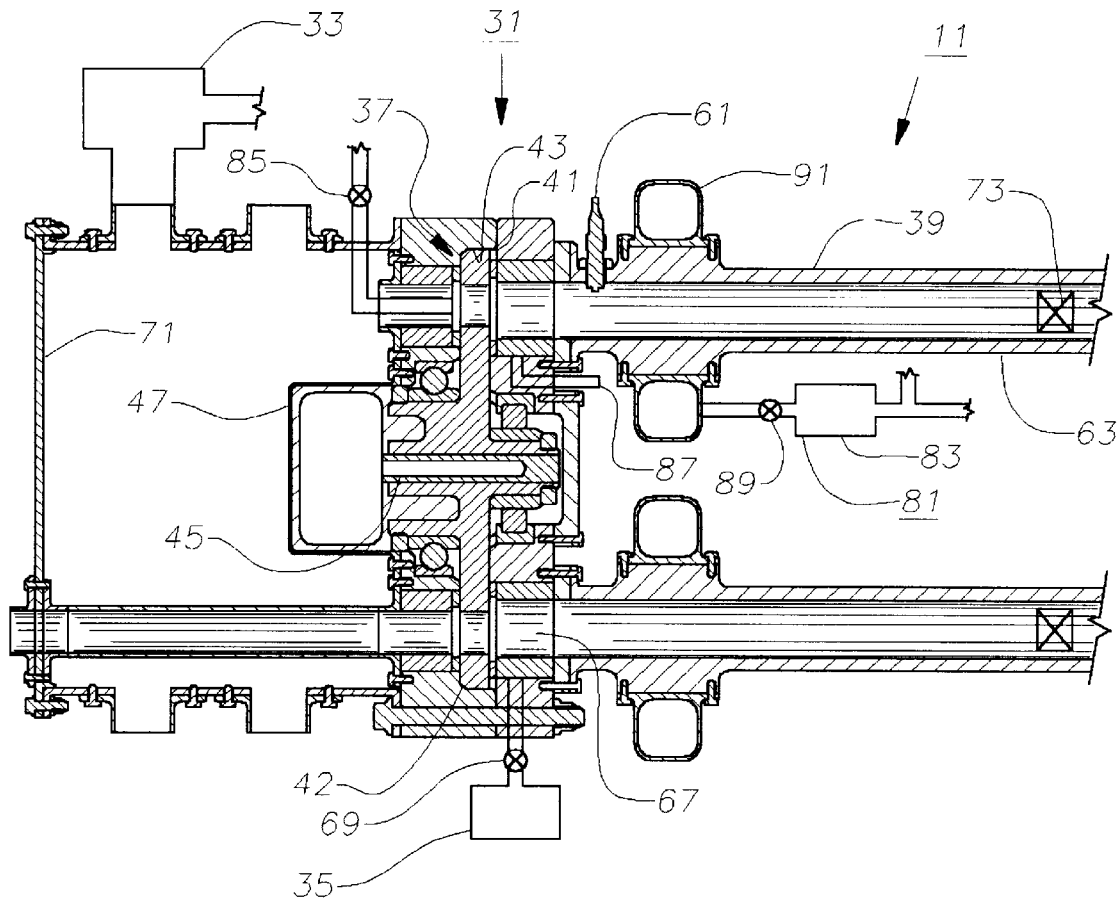
FIG. 1a is a sectional view of a pulse detonation ignition system for a pulse detonation engine constructed in accordance with a first embodiment of this invention.
Figure 1B:
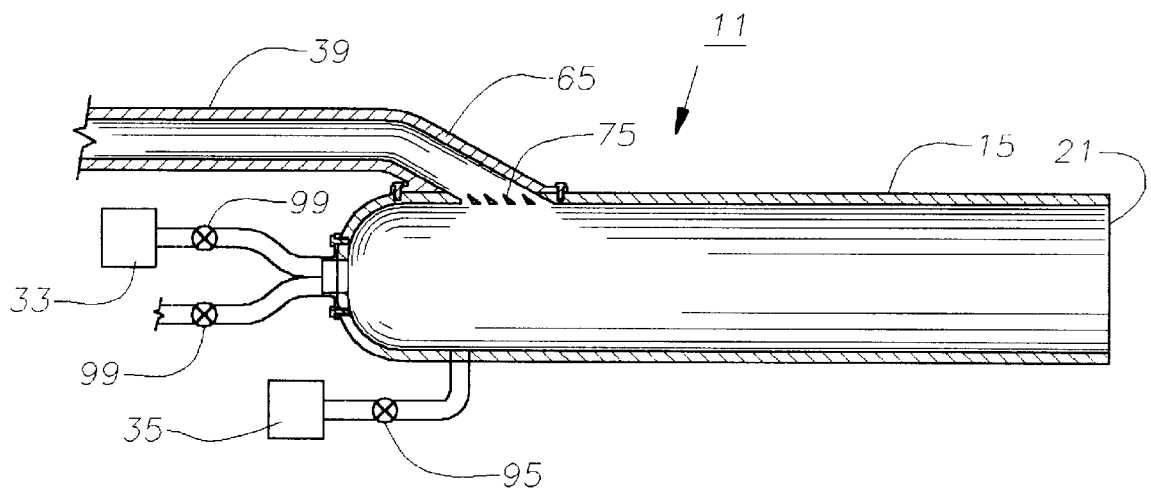

Referring to FIGS. 1a and 1b, a first embodiment of the invention is shown. Pulse detonation engine 11 comprises a pulse ignition system 31, an oxygen supply 33, a fuel supply 35, and a plurality of detonation chambers 15 (only one shown). Pulse ignition system 31 has a rotary valve 37 and a plurality of igniter tubes 39 equal to the number of detonation chambers 15.

Figure 2:
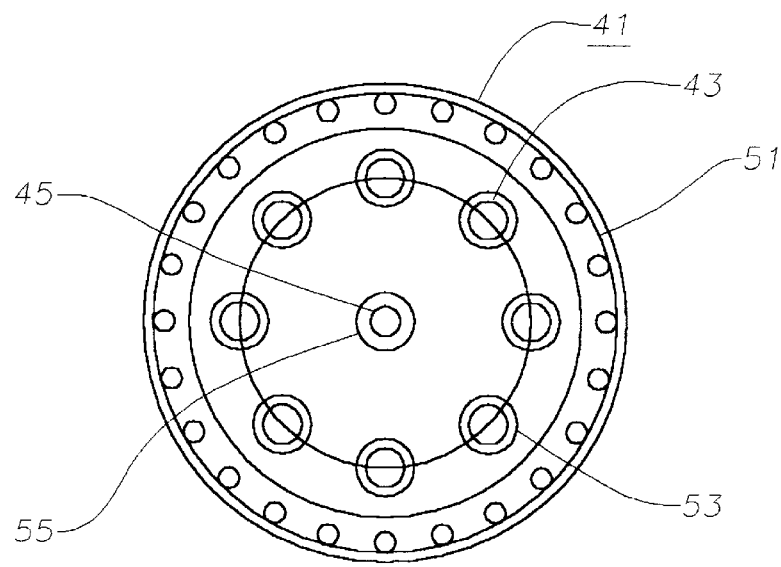
FIG. 2 is a front view of the rotary valve flywheel and valve seals of FIG. 1a constructed in accordance with the invention.

Rotary valve 37 has a circular valve plate or flywheel 41 with a plurality of ports 43. Flywheel 41 is located inside a stationary valve body 42. Flywheel 41 is driven by a shaft 45 extending from an electric motor 47. Referring to FIG. 2, flywheel 41 has an outer seal 51, an inner seal 55, and a plurality of circumferential seals 53 equal to the number of ports 43. Flywheel 41 is sealed on both sides (not shown).

Referring back to FIGS. 1a and 1b, igniter tubes 39 are located downstream from and sealingly communicate with flywheel 41. Each igniter tube 39 has a high energy spark plug igniter 61, a cooling system 63, and a manifold 65 which allows igniter tube 39 to communicate with detonation chamber 15. A fuel valve 69 meters fuel into an entrance region 67 of each igniter tube 39. Fuel source 35 supplies fuel to fuel valves 69 for igniter tubes 39, and to fuel valves 95 for detonation chambers 15.

Oxygen source 33 supplies oxygen to oxidizer plenum 71 for igniter tubes 39, and to oxygen valves 97 for detonation chambers 15. Oxidizer plenum 71 is located upstream from and sealingly communicates with flywheel 41. As flywheel 41 rotates, each port 43 rotatingly aligns with oxidizer plenum 71 and an igniter tube 39 in an open position. During alignment, oxygen passes from oxidizer plenum 71 through port 43 and into entrance region 67. As oxygen enters igniter tube 39, fuel is simultaneously released from fuel valve 69 so that the oxygen mixes with the fuel. As flywheel 41 continues to rotate, port 43 sealingly rotates out of alignment with oxydizer plenum 71 and igniter tube 39 in a closed position. At the same time, fuel valve 69 closes. Shortly thereafter, spark plug igniter 61 ignites the fuel mixture in entrance region 67. The ignited mixture transitions into a detonation wave a few diameters downstream of ignition, perhaps assisted by a turbulator spiral 73. The detonation wave continues to propagate down igniter tube 39, through manifold 65 and into detonation chamber 15. Manifold 65 contains check valves 75 which reduce the area of manifold 65, thereby strengthening the detonation wave and preventing backlash waves from going into igniter tube 39. As the detonation wave enters detonation chamber 15, a second mixture of fuel and oxygen, released from fuel valve 95 and oxygen valve 97 into detonation chamber 15 is ignited. This second ignition increases the magnitude of the detonation wave which then passes through detonation chamber 15 and out a rearward end 21. The speed, temperature and pressure of a detonation wave are much greater than the corresponding measurements for a conventional subsonic deflagration wave. A detonation wave will move at supersonic speeds while achieving a temperature and pressure of approximately 4000 degrees Fahrenheit and 20 atmospheres, respectively.

Pulse detonation engine 11 also has a ventilation or purge system 81 which utilizes an inert gas, preferably helium. Ventilation system 81 synchronizingly ventilates three components of pulse detonation engine 11: rotary valve 37, igniter tube 39 and detonation chamber 15. Ventilation system 81 is needed to purge rotary valve 37 since a small amount of oxygen is trapped between rotary valve 37 and flywheel 41 when oxidizer plenum 71 communicates with igniter tube 39 through port 43. This small amount of oxygen must be purged so that no residual buildup of oxygen occurs in detonation engine 11. Ventilation system 81 has a purge gas source 83 which supplies inert gas through a purge gas valve 85 into rotary valve 37 to purge the trapped oxygen between detonation wave cycles.

Ventilation system 81 is also used to purge igniter tubes 39 and detonation chambers 15. These components must be ventilated after each detonation wave cycle in order to purge any residual gases. Purging igniter tubes 39 and detonation chambers 15 between detonation wave cycles prevents pre-ignition of fuel mixtures delivered into these components for the next detonation wave cycle. Purge gas source 83 supplies inert gas through purge gas valves 89 and 99 to purge igniter tubes 39 and detonation chambers 15, respectively. After each purge cycle, the purge gas exits rotary valve 37, igniter tubes 39 and detonation chambers 15 through purge vents 87 and 91, and rearward ends 21, respectively.

In operation, pulse ignition system 31 creates a detonation wave in each igniter tube 39 by igniting a first fuel mixture inside igniter tube 39. The detonation wave moves through igniter tube 39 and into detonation chamber 15 to ignite a second fuel mixture inside detonation chamber 15. The detonation wave increases in magnitude as the second fuel mixture is ignited. The detonation wave then moves through detonation chamber 15 before exiting the rearward end 21 of detonation chamber 15. After detonation, detonation engine 11 is purged of residual gases by ventilation system 81 and the process is repeated sequentially as described.

Figure 3:
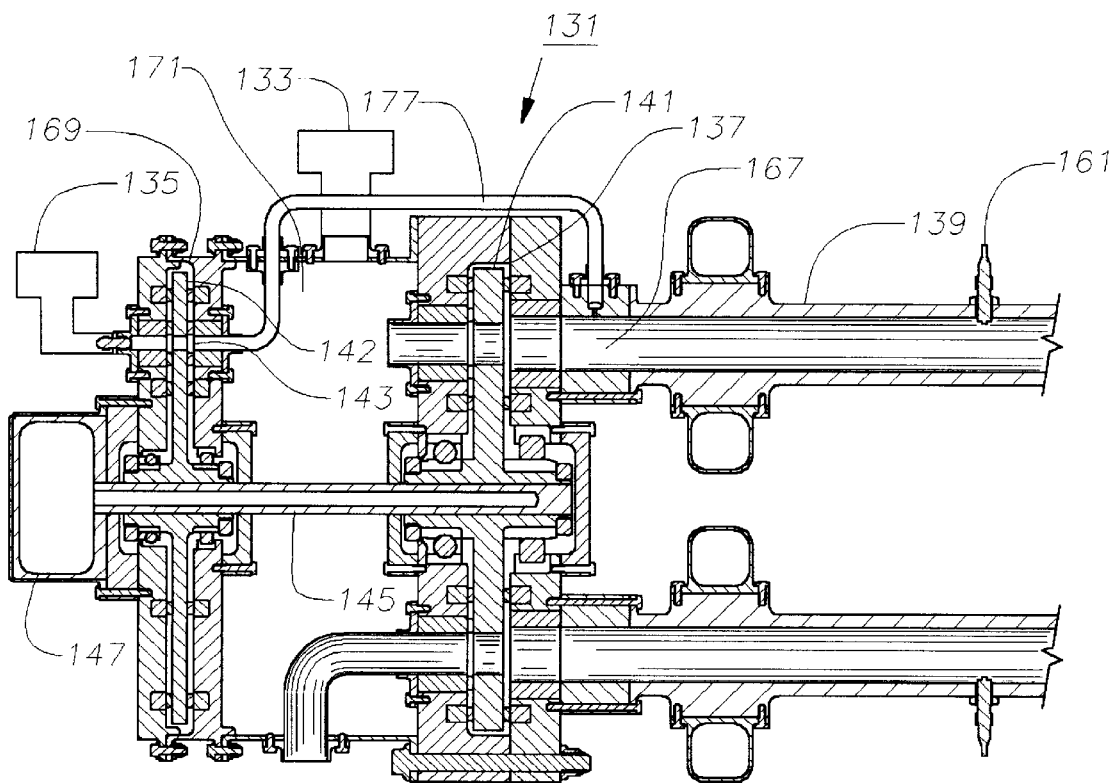
FIG. 3 is a sectional view of a pulse detonation ignition system for a pulse detonation engine constructed in accordance with a second embodiment of this invention.

Referring to FIG. 3, a second embodiment of the invention is shown. A pulse ignition system 131 provides detonation waves for igniting a pulse detonation engine (not shown). Pulse ignition system 131 is very similar to pulse ignition system 31 shown in FIG. 1a. Pulse ignition system 131 has an oxygen supply 133, a fuel supply 135, a rotary oxygen valve 137, a rotary fuel valve 169, and a plurality of igniter tubes 139.

Oxygen valve 137 and fuel valve 169 have a circular valve plate or flywheel 141 and 142, respectively, which rotate inside the respective valves. Flywheels 141 and 142 are driven by a shaft 145 extending from an electric motor 147. Oxygen valve 137 operates in an identical manner as rotary oxygen valve 37 in FIGS. 1a and 2, while fuel valve 169 operates in a very similar manner as valve 37.

Each igniter tube 139 has a high energy spark plug igniter 161 and communicates with a main detonation chamber (not shown). Fuel valve 169 meters fuel into an entrance region 167 of each igniter tube 139 through a conduit 177. Fuel source 135 supplies fuel to fuel valve 169. As flywheel 142 rotates, ports 143 in flywheel 142 rotatingly align with fuel source 135 and igniter tube 139 through conduit 177 in an open position. During alignment, fuel passes from fuel source 135, through each port 143, through conduit 177 and into entrance region 167. As fuel enters igniter tube 139, oxygen is simultaneously released from oxygen valve 137 so that the oxygen mixes with the fuel. As flywheel 142 continues to rotate, port 143 sealingly rotates out of alignment with fuel source 135 and igniter tube 139 in a closed position. At the same time, oxygen valve 137 closes. Shortly thereafter, spark plug igniter 161 ignites the fuel mixture in entrance region 167 and the ignited mixture transitions into a detonation wave. The detonation wave ignites fuel and oxygen in the detonation chambers (not shown) in the same manner as described for FIGS. 1a and 1b. Pulse ignition system 131 also has a ventilation or ventilation system (not shown) which operates in the same manner as ventilation system 81 described above.

In operation, pulse ignition system 131 creates a detonation wave in each igniter tube 139 by igniting a first fuel mixture inside igniter tube 139. The detonation wave moves through igniter tube 139 and into a detonation chamber to ignite a second fuel mixture inside the detonation chamber. The detonation wave increases in magnitude as the second fuel mixture is ignited. The detonation wave then moves through the detonation chamber before exiting the rearward end of the detonation chamber. After detonation, the detonation engine is purged of residual gases by the ventilation system and the process is repeated sequentially as described.

The invention has significant advantages. Pulse detonation engines which utilize a conventional high energy spark plug ignition system for each detonation chamber have excessive weight for some flight vehicle applications. This invention utilizes a relatively lightweight pulse detonation wave ignition system. Detonation waves provide excellent ignition capability since detonation wave energy can be delivered at a high frequency and it is much stronger than the energy supplied by conventional spark systems.

While the invention has been shown in only two of its forms, it should be apparent to those skilled in the art that it is not so limited, but is susceptible to various changes without departing from the scope of the invention.

We claim:

1. A pulse detonation engine, comprising in combination:

an oxygen source;

a fuel source;

a detonation chamber having an upstream end, an open downstream end, an oxygen port and a fuel port which are supplied with oxygen and fuel from the oxygen source and the fuel source, respectively, and a detonation wave port adjacent to the upstream end;

a pulse detonation igniter tube having a downstream end communicating with the detonation wave port of the detonation chamber;

an oxygen valve means for admitting oxygen from the oxygen source into the igniter tube;

a fuel valve port located in the igniter tube downstream from the oxygen valve for communicating fuel from the fuel source to the igniter tube; and an igniter for detonating fuel and oxygen admitted into the igniter tube to create detonation waves, each of the detonation waves passing through the igniter tube, through the detonation wave port and into the detonation chamber for igniting fuel and oxygen admitted therein to enhance the magnitude of each of the detonation waves which discharge from the downstream end of the detonation chamber; and check valves located between the igniter tube and the detonation chamber for reducing a detonation port area, the check valves enhancing the strength of each of the detonation waves and preventing backlash waves from entering the igniter tube from the detonation chamber.

2. The pulse detonation engine according to claim 1 further comprising purge means for purging the igniter tube and the detonation chamber after each of the detonation waves has occurred and prior to admitting fuel and oxygen into the igniter tube and the detonation chamber for a next cycle.

3. The pulse detonation engine according to claim 1 further comprising a turbulator device located in the igniter tube for enhancing the development of each of the detonation waves.

4. The pulse detonation engine according to claim 1 wherein the igniter means creates a spark.

5. A pulse detonation engine, comprising in combination:

an oxygen source;

a fuel source;

a detonation chamber having an upstream end, an open downstream end, an oxygen port, a fuel port and a detonation wave port adjacent to the upstream end;

a pulse detonation igniter tube having a downstream end communicating with the detonation wave port of the detonation chamber;

valve means for admitting oxygen and fuel from the oxygen and fuel sources into the igniter tube and for admitting oxygen and fuel from the oxygen and fuel sources into the oxygen and fuel ports of the detonation chamber; and igniter means for detonating fuel and oxygen admitted by the valve means into the igniter tube to create detonation waves, each of the detonation waves passing through the igniter tube, through the detonation wave port and into the detonation chamber for igniting fuel and oxygen admitted by the valve means into the detonation chamber to enhance the magnitude of each of the detonation waves which discharge from the downstream end of the detonation chamber; and wherein the oxygen source comprises an oxidizer plenum located upstream from the igniter tube;

the valve means comprises a stationary valve body with a rotatable valve plate, the valve body being located between the oxidizer plenum and the igniter tube, the valve plate having at least one port which communicates with the oxidizer plenum and the igniter tube at least once per revolution;

valve plate drive means for rotating the valve plate within the valve body relative to the igniter tube and the oxidizer plenum; and wherein the fuel source has a fuel valve port located downstream from the valve plate, the fuel valve port communicating with the igniter tube; and the igniter means detonates the fuel and oxygen when the valve plate port and the fuel valve port are closed.

6. In a pulse detonation engine having a detonation chamber with an upstream end, an open downstream end, an oxygen port, a fuel port, and a valve for synchronizing the release of oxygen and fuel from an oxygen source and a fuel source into each of the oxygen and fuel ports, respectively, the improvement comprising:

a detonation wave port adjacent to the upstream end of each of the detonation chambers;

a plurality of pulse detonation igniter tubes, each having a downstream end communicating with the detonation wave port in one of the detonation chambers;

an oxidizer plenum located upstream from the igniter tubes;

an igniter oxygen valve for releasing oxyaen into each of the igniter tubes;

a fuel valve communicating with each of the igniter tubes;

an igniter for detonating fuel and oxygen in each of the igniter tubes for creating detonation waves which pass through the igniter tubes, through the detonation wave ports and into the respective detonation chambers for igniting fuel and oxygen supplied into the detonation chambers, thereby causing the detonation waves to increase in magnitude, propagate through the detonation chambers and discharge out the downstream ends of the discharge chambers;

a purge mechanism for purging the igniter tubes and the detonation chambers after each of the detonation waves has occurred and prior to admitting fuel and oxygen to the igniter tubes and the detonation chambers for a next cycle;

the igniter oxygen valve comprises a stationary valve body with a rotatable valve plate, the valve body being located between the oxidizer plenum and the igniter tubes and upstream from the fuel valve, the valve plate having a plurality of ports, each of the valve plate ports communicating with the oxidizer plenum and each igniter tube at least once per revolution; and wherein the igniter detonates fuel and oxygen when the valve plate port and the fuel valve are closed; and further comprising:

a valve plate drive mechanism for rotating the valve plate within the valve body relative to the igniter tubes and the oxidizer plenum.

7. The pulse detonation engines according to claim 6 wherein the igniter means creates a spark.

8. A pulse detonation engine, comprising in combination:

a detonation chamber having an upstream end and an open downstream end, the upstream end having a fuel port, an oxygen port, and a detonation wave port;

detonation chamber valve means for synchronizing the release of oxygen and fuel into the fuel and oxygen ports of the detonation chamber;

a pulse detonation igniter tube having a downstream end communicating with the detonation wave port of the detonation chamber;

an oxidizer plenum located upstream from the igniter tube;

a first rotary valve with a first valve body and a first rotatable valve plate for metering oxygen into the igniter tube, the first rotary valve being located between the oxidizer plenum and the igniter tube, the first valve plate having at least one port which communicates with the oxidizer plenum and the igniter tube at least once per revolution;

a fuel plenum;

a second rotary valve with a second valve body and a second rotatable valve plate for metering fuel into the igniter tube, the second valve plate having at least one port which communicates with the fuel plenum and the igniter tube at least once per revolution, the second valve plate port being located downstream from the first valve plate port;

valve plate drive means for rotating the first valve plate within the first valve body and the second valve plate within the second valve body relative to the igniter tube;

timing means for synchronizing the release of oxygen and fuel by the first rotary valve and the second rotary valve, respectively, into the igniter tube;

igniter means for detonating fuel and oxygen released by the rotary valves into the igniter tube to create detonation waves, each of the detonation waves passing through the igniter tube, through the detonation wave port and into the detonation chamber for igniting fuel and oxygen released by the detonation chamber valve means into the detonation chamber to enhance the magnitude of each of the detonation waves which discharge from the downstream end of the detonation chamber; and purge means for purging the igniter tube and the detonation chamber after each of the detonation waves has occurred and prior to admitting fuel and oxygen into the igniter tube and the detonation chamber for a next cycle.

9. A pulse detonation engine, comprising in combination:

a detonation chamber having an upstream end and an open downstream end;

a detonation chamber valve mechanism for synchronizing the release of oxygen and fuel into the detonation chamber;

a pulse detonation igniter tube having a downstream end which communicates with the detonation chamber;

a first rotary valve for metering oxygen in discrete pulses into the igniter tube;

a second rotary valve for metering fuel in discrete pulses into the igniter tube; and an igniter mounted to the igniter tube for detonating fuel and oxygen released by the rotary valves into the igniter tube to create detonation waves, each of the detonation waves passing through the igniter tube and into the detonation chamber for igniting fuel and oxygen released into the detonation chamber to enhance the magnitude of each of the detonation waves which discharge from the downstream end of the detonation chamber.

10. The pulse detonation engine of claim 9, further comprising:

a valve drive mechanism for rotating each of the rotary valves; and a timing mechanism for synchronizing the release of oxygen and fuel by the first rotary valve and the second rotary valve, respectively, into the igniter tube.

11. The pulse detonation engine of claim 9, further comprising a purge mechanism for purging the igniter tube and the detonation chamber after each of the detonation waves has occurred and prior to admitting fuel and oxygen into the igniter tube and the detonation chamber for a next cycle.

12. A pulse detonation engine, comprising in combination:

a detonation chamber having an upstream end and an open downstream end;

a detonation chamber valve for synchronizing the release of oxygen and fuel into the detonation chamber;

a plurality of pulse detonation igniter tubes each having a downstream end which communicates with the detonation chamber;

a first rotary valve for metering oxygen in discrete pulses into the igniter tubes;

a second rotary valve for metering fuel in discrete pulses into the igniter tubes;

an igniter mounted to each of the igniter tubes for detonating fuel and oxygen released by the rotary valves into the igniter tubes to create detonation waves, each of the detonation waves passing through the igniter tubes and into the detonation chamber for igniting fuel and oxygen released into the detonation chambers to enhance the magnitude of each of the detonation waves which discharge from the downstream end of the detonation chambers; and wherein each of the rotary valves comprises a valve housing with a rotary valve plate having at least one port which communicates one of the oxygen and fuel into the igniter tube at least once per revolution of the rotary valve plate.

13. The pulse detonation engine of claim 12, further comprising:

a drive mechanism for rotating each of the rotary valve plates; and a timing mechanism for synchronizing the release of oxygen and fuel by the first rotary valve and the second rotary valve, respectively, into the igniter tubes.

14. The pulse detonation engine of claim 12, further comprising a purge mechanism for purging the igniter tubes and the detonation chambers after each of the detonation waves has occurred and prior to admitting fuel and oxygen into the igniter tubes and the detonation chambers for a next cycle.

\* \* \* \* \*